United States Patent
Schmid (10) Patent No.: US 12,373,940 B2
(45) Date of Patent: Jul. 29, 2025

(54) METHOD AND DEVICE FOR EVALUATING A WELDING QUALITY OF A WELD SEAM BETWEEN END SECTIONS OF TWO CONDUCTOR ELEMENTS

(71) Applicant: Gehring Technologies GmbH + Co. KG, Ostfildern (DE)

(72) Inventor: Laurens Schmid, Neckartenzlingen (DE)

(73) Assignee: Gehring Technologies GmbH + Co. KG, Ostfildern (DE)

( * ) Notice: Subject to any disclaimer, the term of this patent is extended or adjusted under 35 U.S.C. 154(b) by 0 days.

(21) Appl. No.: 18/851,561

(22) PCT Filed: Mar. 29, 2023

(86) PCT No.: PCT/EP2023/058131
§ 371 (c)(1),
(2) Date: Sep. 26, 2024

(87) PCT Pub. No.: WO2023/186975
PCT Pub. Date: Oct. 5, 2023

(65) Prior Publication Data
US 2025/0111496 A1   Apr. 3, 2025

(30) Foreign Application Priority Data
Apr. 1, 2022  (DE) .................... 10 2022 107 886.8

(51) Int. Cl.
*G06T 7/00* (2017.01)
*G01N 21/88* (2006.01)

(52) U.S. Cl.
CPC ......... *G06T 7/001* (2013.01); *G01N 21/8851* (2013.01); *G01N 2021/8887* (2013.01);
(Continued)

(58) Field of Classification Search
CPC .. G01N 2021/95615; G06T 2207/3013; G06T 2207/30108; G06T 2207/30152
See application file for complete search history.

(56) References Cited

U.S. PATENT DOCUMENTS 5,061,841 A * 10/1991 Richardson .......... B23K 9/0956
219/130.01
5,920,014 A *  7/1999 Waschkies ........... G01N 29/326
73/602
(Continued)

FOREIGN PATENT DOCUMENTS

CN      104977305 A      10/2015
CN      108596880 A  *    9/2018
(Continued)

OTHER PUBLICATIONS

A. Mayr, L. Hauck, M. Meiners and J. Franke, "Prediction of the Joint Cross-Section of Laser-Welded Hairpin Windings Based on 2D Image Data Using Convolutional Neural Networks," 2020 10th International Electric Drives Production Conference (EDPC), Ludwigsburg, Germany, 2020, pp. 1-7, (Year: 2020).*
(Continued)

*Primary Examiner* — Michael Robert Cammarata
(74) *Attorney, Agent, or Firm* — CARTER, DELUCA & FARRELL LLP (57) ABSTRACT

A method for evaluating a welding quality of a weld seam with which the end sections of conductor elements are welded to one another by irradiating their end faces. The method includes capturing an image of the end faces and dividing the image into a first subset of pixels whose intensity levels are greater than a specified intensity level threshold value and into a second subset of pixels whose intensity levels are less than or equal to the intensity level threshold value. The method includes assessing the welding quality of the weld seam based on a comparison of a number (Continued)

and/or position of the pixels of the first subset and/or of the second subset with a pixel target value of a number and/or a pixel target range of a position of pixels of the first subset and/or of the second subset that correspond to a weld seam of desired quality.

16 Claims, 6 Drawing Sheets

(52) U.S. Cl.
CPC ............. *G06T 2207/20021* (2013.01); *G06T 2207/30136* (2013.01)

(56) References Cited

U.S. PATENT DOCUMENTS

| | | | |
|---|---|---|---|
| 8,110,774 B2* | 2/2012 | Huonker | B23K 26/03 219/121.64 |
| 9,077,927 B2* | 7/2015 | Miyagawa | H04N 1/00063 |
| 10,036,731 B2* | 7/2018 | Edwards, II | G01N 29/262 |
| 10,239,154 B2* | 3/2019 | Ciampolini | H02K 3/12 |
| 2011/0142326 A1* | 6/2011 | Shinoda | G06T 7/001 382/149 |
| 2013/0075371 A1* | 3/2013 | De Souza | B23K 31/125 219/109 |
| 2016/0139593 A1* | 5/2016 | Willett | G05B 19/41875 700/109 |
| 2022/0048137 A1* | 2/2022 | Kallage | B23K 26/28 |
| 2022/0126405 A1* | 4/2022 | Maslar | B23K 31/006 |
| 2022/0263390 A1* | 8/2022 | Bapp | H02K 15/35 |
| 2023/0068733 A1* | 3/2023 | Bocksrocker | G01N 25/72 |
| 2024/0181513 A1* | 6/2024 | Ono | B21C 51/00 |

FOREIGN PATENT DOCUMENTS

| | | | | |
|---|---|---|---|---|
| CN | 105976352 B | * | 1/2019 | ........... G06T 7/0004 |
| CN | 1 12 548 321 A | | 3/2021 | |
| DE | 19935777 B4 | * | 8/2006 | ............ B23K 11/04 |
| DE | 102008062866 A1 | | 5/2010 | |
| DE | 102011102010 A1 | | 3/2012 | |
| DE | 102021002917 A1 | | 7/2021 | |
| DE | 10 2020 210 419 A1 | | 2/2022 | |
| DE | 10 2020 213 109 B3 | | 2/2022 | |
| DE | 10 2020 214 125 B3 | | 3/2022 | |
| EP | 0996091 A1 | | 4/2000 | |
| EP | 3900870 A1 | * | 10/2021 | ........... B23K 26/032 |
| JP | 2014238387 A | | 12/2014 | |
| JP | 2019120650 A | | 7/2019 | |
| KR | 102165261 B1 | * | 10/2020 | |
| WO | WO-2020129617 A1 | * | 6/2020 | ........... B23K 26/032 |
| WO | WO-2023170570 A1 | * | 9/2023 | ............... G06T 3/40 |

OTHER PUBLICATIONS

J. Hassan, A. M. Awan and A. Jalil, "Welding Defect Detection and Classification Using Geometric Features," 2012 10th International Conference on Frontiers of Information Technology, Islamabad, Pakistan, 2012, pp. 139-144, doi: 10.1109/FIT.2012.33. (Year: 2012).*
Examination Report for DE 10 2022 107 886.8 dated Dec. 8, 2022 with English translation.
Ninomiya et al.,, Automatic 21/2D Shape Inspection System for Via-Hole Fillings of Green Sheets By Shadow Image Analysis Proceedings of the International Conference On Robotics and Automation. Scottsdale, May 15-19, 1989; {Proceedings of the International Conference On Robotics and Automation], Washington, IEEE Comp. Soc. Press, US, vol. vol. 1, No. 1989, May 15, 1989 (May 15, 2989), pp. 515-520 ISBN: 978-0-8186-1938-0. XP000042748.
Mayr et al., "Evaluation of Machine Learning for Quality Monitoring of Laser 1-16 Welding Using the Example of the Contacting of Hairpin Windings", Dec. 4, 2018, BNSDOCID, XP, 3526174A 1,978-1-7281-0148-4/18/$31.00 ©2018 IEEE.
Vater, et al. "Quality Control and Fault Classification of Laser Welded Hairpins in Electrical Motors", Dated Dec. 18, 2020, 14:19:39 UTC from IEEE Xplore, EUSIPCO 2020,978-9-0827-9705-3.
International Search Report for PCT/EP2023/058131 dated Jun. 22, 2023, 3 pages.
Written Opinion for PCT/EP2023/058131 dated with English translation.
Takanori et al.: "Automatic 2½ 0 shape inspection system for via-hole fillings of green sheets by shallow image analysis", Proceedings of the International Conference on Robotics and Automation. Scottsdale, May 15-19, 1989, Washington, IEEE Comp. Soc. Press, US, Bd. 1, Nr. 1989, May 15, 1989, Seiten 515-520, XP000042748.
EP Communication for Application No. 23 714 758.2 dated Jan. 15, 2024, 5 pages.
EP Decision to Grant for Application No. 23714758.2 dated May 10, 2024, 2 pages.
Chinese Office Action for application No. 202380029376.2 dated Mar. 1, 2025 with English translation.

* cited by examiner

METHOD AND DEVICE FOR EVALUATING A WELDING QUALITY OF A WELD SEAM BETWEEN END SECTIONS OF TWO CONDUCTOR ELEMENTS

The invention relates to a method and a device for evaluating a welding quality of a weld seam with the end sections of at least two elongated conductor elements which are welded to one another by irradiating their end faces.

Methods and devices for producing stators are known in the prior art. Stators are used in electrodynamic machines or electromechanical converters, e.g. in electric motors.

In the production of electromechanical transducers, in particular electric motors, in particular for traction drives, individual winding elements (plug-in coils, so-called "hairpins") are produced, which are further processed into a stator winding during the further process.

In order to achieve a higher efficiency of electric machines due to a higher degree of filling, a change was made in hairpin technology from round to rectangular conductor cross-sections. Within the scope of the invention, the use of any conductor cross-sections is possible, i.e. for example round or rectangular cross-sections.

Within the context of producing the winding elements, corresponding conductor parts are separated from endless material, for example by cutting. The conductor pieces are then stripped of insulation at portions that are to be welded in a later step. The conductor pieces can then be formed into suitable winding elements, e.g. bent into corresponding hairpins. A hairpin typically has two legs that are connected to each other by a connecting portion (similar to the closed end of a U-shaped hairpin). On the side facing away from the connecting portion, the legs each have a free end. The legs are usually parallel to each other and each have a stripped portion in the region of their ends, in which region the hairpins can later be welded.

A plurality of hairpins can be joined together to form a basket (stator basket) and, optionally, paper insulation can be inserted into the stator. The hairpins or basket are then inserted into the stator and their ends are twisted against each other if necessary ("twisting"), which allows the hairpins to be held in a manner in the stator core with a positive fit. The winding elements or hairpins can be welded to on another at their ends after positioning on the stator. In order to make this welding safe and reproducible, the hairpins to be welded together should be positioned in a precisely defined position relative to each other to ensure their desired contact with each other.

The welding itself is typically done using laser radiation. For this purpose, a corresponding laser beam source and a so-called scanner optics with a camera are usually used. The scanner optics enable the camera to detect the position of the ends of the conductor elements before welding, and the scanner optics also enable, using two movable mirrors, a highly dynamic movement of the laser beam on the end faces of the two conductor elements to be welded. The number of conductor elements to be welded per stator is typically in the three-digit range. A defective weld can lead to failure of the stator. Since the quality of the weld seam depends on various factors, quality control is necessary. Quality criteria for the weld seam can be determined individually, but they usually have in common that a certain connection cross-section is necessary to ensure the desired current flow.

Different methods are known for the quality control of welded hairpins. This includes, for example, a cross-section through the weld seam. The disadvantage is that the type of quality control is a destructive test, and is costly and time-consuming. For example, it is also known to measure the weld bead produced in the weld seam using optical coherence tomography or a laser sensor for profile measurement. The disadvantage is that additional technical equipment is required for this, and that this measurement is slow and therefore costly. A lateral image of the welded hairpins, i.e. when viewed in the plane of the end faces, was also proposed in JP2019120650A. However, this also requires additional and expensive equipment. In addition, only one hairpin weld seam can be examined at any one time. Finally, a measurement of the process light during the welding process has already been proposed. However, it is difficult to establish an exact correlation between the measured light signal and the welding result.

Overall, the known quality control methods are disadvantageous in many respects; in particular, they are complex and costly and prone to errors.

The invention is based on the object of overcoming these and other disadvantages of the prior art and of providing a method and a device with which a quality control of a weld seam between end sections of at least two elongated conductor elements can be carried out in a simple, cost-effective, fast, and precise manner.

The object is achieved by a method according to claim 1 and a device according to claim 14.

The method is therefore a method for evaluating the welding quality of a weld seam between end sections of at least two elongated conductor elements which are welded to one another by irradiation, in particular by irradiation by means of a laser, of their end faces.

The method comprises at least the following steps:
(a) Capturing an image of the end faces of the conductor elements welded to one another by means of the weld seam. Here the image is recorded from the end faces of the conductor elements and the region captured by the image includes at least one entire surface of the weld seam on the end face of the conductor pieces. In addition, the image is captured with different intensity levels for each pixel of the image. The intensity levels are an indicator of the amount of light that was reflected locally by the recorded position when the image was taken. The indicator or the amount of light is therefore a measure of the local orientation of the surface of the weld seam. In particular, the weld seam is illuminated with light in parallel with the direction of recording of the image.
(b) Dividing the image into a first subset of pixels, the intensity levels of which are greater than a determined intensity level threshold value, and into a second subset of pixels, the intensity levels of which are less than or equal to the intensity level threshold value.
(c) Assessing the welding quality of the weld seam by comparing a number and/or position of pixels of the first subset and/or of the second subset with at least one pixel target value of a number and/or a pixel target range of a number and/or position of pixels of the first subset and/or of the second subset corresponding to a weld seam of desired quality.

The invention therefore proposes a method for quality control of the welded end sections or ends of two or more conductor elements, with the aid of which the connection cross-section of the weld seam is assessed. Quality control is carried out by comparing the recorded pixels or their number per subset and/or their position per subset with target values (pixel target value or pixel target range). The method is non-destructive, simple, cost-effective, fast, and precise. Quality control may, for example, require a certain number of pixels in a subset or a certain spatial distribution of pixels in a subset. This will be discussed in more detail below.

The following explanations refer equally to the method and to the device according to the invention.

According to the invention, an image of welded end faces of conductor elements is captured, in particular by means of an image capturing means, in particular a camera. The image is taken from the end faces of the conductor elements and therefore shows the weld seam from above, or viewed vertically onto the end faces of the conductor elements or conductor portions.

From above here means situated opposite the end faces. The image captures a region that includes at least the entire weld seam or the size of the desired weld seam in the intended position. Parts of the surface or end faces of the conductor elements and, if applicable, their surroundings can also be part of the captured image.

The weld seam is here typically formed in the shape of a weld bead (substantially hemispherical). The weld bead forms after a spherical or ball-like melt pool is created by the (laser) irradiation at the end sections of the conductor elements. Consequently, the solidified weld bead also has a spherical or hemispherical shape.

The end sections of the conductor elements extend in the direction of the image capturing means and the end faces are perpendicular to this. The viewing direction of the image capturing means is therefore perpendicular to the end faces. Typically, the weld seam and its surroundings are illuminated from the direction of the image capturing means or camera, i.e. parallel to its beam path, for which a lighting device can be provided on the corresponding device or used as part of the method.

The illumination light incident on the weld seam or the weld bead is reflected by it and allows the weld bead or its spherical shape or the shape of the weld seam to be recognized in the recorded image. When the illumination light is reflected, for example if the weld seam is largely spherical or hemispherical in shape, a different part of the light is reflected depending on the local position on the surface of the weld seam. A hemispherical weld bead thus appears bright in the center of the captured image and darker towards the edge of the captured image. Light directed perpendicularly onto the end face of the conductor elements is reflected at regions of the weld seam running parallel to the end face to a greater extent in the direction of the image capturing means for capturing the image than light that falls on adjacent angled regions of the weld seam.

The weld seam can thus be seen on the captured image through different intensity levels of the pixels of the image. Advantageously, the intensity levels are gray levels of a gray level image. The image can be recorded directly in gray levels or converted from a recorded color image into a gray level image through image processing. The different intensity levels, particularly gray levels, of the individual pixels in the captured image are, as explained, caused by the different amounts of light reflected from the region in which the weld seam is located and which the image depicts. Depending on the shape of the surface of the weld seam, in particular the weld bead, a smaller or larger amount of light is reflected back into a beam path of the image capturing means at a certain point on the surface, which leads to a different exposure of the pixels of the image. Thus, the intensity levels (or gray level values) serve not only as an indicator of the amount of reflected light, but also as a measure of the local orientation of the surface of the weld seam via the amount of reflected light. The local orientation of the surface of the weld seam, in particular the weld bead, refers to the geometry or shape of the weld seam, i.e. its extension in different spatial directions.

Furthermore, according to the invention, the image is divided into pixels of a first subset and a second subset based on their intensity levels and in comparison to a previously defined intensity level threshold value, in particular based on reference measurements carried out on weld seams deemed to be good (i.e. on weld seams that have sufficient or satisfactory quality according to desired criteria). It is also possible to divide the image into further subsets of pixels by specifying a plurality of intensity level threshold values. The division of the image based on the defined intensity level threshold value now makes it possible for only two (or more, but few) different types or quantities of pixels to be evaluated for the assessment of the welding quality. This allows simplified processing of pixel data for simple, fast and yet precise evaluation of the welding quality of the weld seam in the subsequent step of the method.

If the pixels are divided into a plurality of subsets, quality control can be carried out by comparing a number and/or position of pixels in the different subsets with a pixel target value or pixel target range. This can be done as described here using the first and second subsets.

Preferably, gray levels are used as intensity levels and a gray level threshold value is used as intensity level threshold value. If, for example, gray levels are used as intensity levels of a gray level image with 8 bit color depth or 256 gradations, the individual pixels of the gray level image can have up to 256 different gray levels, each of which is created as a result of a different amount of light reflected onto the camera. By dividing the image into pixels of only a first subset (pixels with an intensity level above a threshold value; the intensity level can be a gray level) and a second subset (with an intensity level equal to or below a threshold value; the intensity level can be a gray level), the individual pixels are assigned only one of two (number of subsets) values instead of 256 possible gray level values (where 0 is the smallest value for black, or no exposure, and 255 is the largest value for white, highest exposure), where this value is an assignment to the first subset or to the second subset. The gray levels are an exemplary, but preferred, choice of intensity levels. However, it is also possible to choose color tones as intensity levels. Subsets with their own threshold values can also be created for individual color channels.

When forming subsets, it is possible to binarize the captured image. This produces a binary image that visualizes the division of the image into pixels of the first subset and the second subset. The intensity level threshold value can be individually adjusted for different process parameters.

The binary image thus generated or the division of the image into pixels of the first subset and the second subset, which for example can be stored or is stored in a table, now shows the local orientation of the surface of the weld seam, in particular the weld bead, created by welding based on the number and position of the pixels of the first subset and/or the second subset, and allows an assessment of the welding quality by assessing the number and/or position of the pixels of the first subset and/or the second subset, in particular the combination of number and position. The position of the pixels here refers to a spatial position in the image or the location of the pixels in the image. The position of a pixel can be specified for example by specifying two-dimensional coordinates of the pixel in an image plane spanned by orthogonal axes or by specifying quadrants in a grid superimposed on the image. For the assessment, an optimal range of pixels or a target pixel range for the number and/or position of the pixels, which is given in particular for target weld seams or weld seams with high welding quality, is used for comparison with the given number and/or position of the pixels of the first subset and/or the second subset in the binary image or the table.

The pixel target value can be specified, for example, by a target number of pixels in the first subset or the second subset, below or above which a properly made weld seam is assumed. Thus, a single pixel target value, such as a target number of pixels of a certain subset, defines an easily verifiable quality criterion. The target quantity can be a minimum quantity or a maximum number or an interval limited by a minimum quantity and a maximum number.

A pixel target range can be a specific specification regarding the position of pixels of a subset in the image. For example, one criterion may be that more or fewer pixels of a subset must be present in a subregion of an image.

The given weld seam is compared based on its pixels of the first and/or second subset with an optimal target specification of these pixels. If there is a sufficiently large agreement as defined by the pixel target range, it can be assessed that the welding quality is sufficient. Otherwise, the welding quality may be judged as insufficient or faulty.

For example, the number of pixels in the first subset can be compared with a target value. It is also possible to compare the number of pixels of the first subset within a certain region of the image with a target value. In particular, it can be provided that the pixels in a certain specified region of the image are not taken into account in the comparison and, for example, to consider only the number of pixels of a relevant subset outside this region.

By assessing the welding quality, it is possible to determine which weld seams are found acceptable and which are not.

Furthermore, however, the proposed method also makes it possible to specify the quality in more detail, based on the recognition of other features, in particular the shape of the weld bead. For example, the shape of the weld bead and thus for example a symmetry or asymmetry can be determined based on the position and number of pixels of the first subset and/or the second subset in the image.

Typically, the evaluation of the welding quality of conductor elements welded to one another of stators of electrodynamic machines, in particular electric motors, in particular electric motors, is carried out as part of the method according to the invention.

In particular, the conductor elements are hairpins of a stator of an electrodynamic machine, in particular an electric motor. Given the large number of weld seams resulting from the large number of hairpins on the stator, the method according to the invention enables particularly cost-effective, fast, and reliable quality control of all weld seams.

It is possible that within the scope of the invention the image is a subregion of a higher-level image that includes a plurality of weld seams. The evaluation can then be carried out on each image (part of the higher-level image). In this way, a plurality of weld seams can be evaluated at one time with one image.

A step of cropping the image to a region that includes the weld seam can be performed and the evaluation can be carried out only in this subregion. Typically, this subregion is the image of the end faces of the conductor elements and, if applicable, parts of the weld seam that protrude beyond them. If there are a plurality of weld seams in the image or a higher-level image, individual regions of each weld seam can be cropped. This reduces the amount of data to be processed and also allows the method to be carried out only in the relevant region of the weld seam, thus avoiding errors in the evaluation.

As already explained, it can be provided that a particular region of the image is not taken into account in the evaluation. For example, this can be a central region around the center of the weld seam (in the case of a spherical weld seam on two conductor elements). Here, one can typically assume that virtually all pixels in this region can be assigned to the first subset (strong reflection, bright) if the weld seam is formed as intended. Including these pixels, for example, in the consideration of the set of pixels of the first subset can reduce its relative accuracy. For example, the region that is left out of the evaluation can be defined as a region in which the surface of a weld seam formed as intended is essentially "flat", i.e. orthogonal to the viewing direction of the image capturing means. Put simply, this is advantageous because the center of the weld bead appears bright in the image due to the reflection of the illuminating light and predominantly contains pixels of the first or second subset assigned to the bright region. If individual pixels in this region are not assigned to the first subset (bright) for various reasons, this typically has no significance with regard to the surface inclination. If these pixels are taken into account in an analysis, this can make the result less accurate. In other words, by leaving out of consideration a region that is to be almost completely assigned to one subset in a weld seam formed as intended, the sensitivity of the control in critical regions can be increased.

The central region is preferably a round or elliptical region with a predetermined radius, into which, for example, a predetermined minimum number of pixels of the first subset (bright) falls, or in which a high degree of reflection is present, when the weld seam is properly made. A properly made weld seam is to be understood as a weld seam that has a specified welding quality, in particular minimum quality. In a weld seam that connects three or more conductor elements, the central region, which is not taken into account in the evaluation, is typically elliptical because the weld is not round, but rather is elongated.

For example, a properly made weld seam may have a certain number of pixels in the first subset or a certain number of pixels in the first subset outside a region not taken into account in the evaluation.

A properly made weld seam can, for example, also have a certain symmetry in the distribution of pixels of the first and second type (pixel target range).

The maximum number of pixels of the first subset or the second subset can, for example, be specified absolutely or relatively in relation to the totality of the pixels of the first subset or the second subset. The maximum number can be determined from a sample of properly made weld seams or weld seams with sufficient welding quality. For example, in the case of a round region, as is particularly useful in the case of two conductor elements welded to one another, a radius for the central region can be specified so that, on average or mean of the samples, a minimum amount, for example 90%, of all pixels of the first subset or the second subset lie in the cut-out central region. Alternatively, the cut-out region may be elliptical in shape if more than two conductor elements are welded to one another and an image of them is taken.

Preferably, the pixel target value of the number and/or the pixel target range of the position is determined by a selection of a minimum connection cross-section as a quality feature of the welding quality. This can be done through a separate determination step in the method. This step is based on the recognition that the number and/or position of the pixels of the first subset and/or second subset correlates with the connection cross-section, and therefore a minimum connection cross-section can be determined via them.

Consequently, data by which a number and/or position of pixels of the first subset and/or the second subset is correlated with connection cross-sections of weld seams can advantageously be used to determine the pixel target value of the number and/or the pixel target range of the position. For example, connection cross-sections of different weld seams can be determined, for example by cross-sectioning, and set in relation to the number and/or position of pixels of the first subset and/or second subset in order to obtain a database that can be used to determine the pixel target value of the number and/or the pixel target range of the position based on the desired minimum connection cross-section.

To determine the welding quality, it is in principle possible to evaluate only the number, only the position, or the combination of number and position of the pixels of the first subset and/or the second subset. In the latter case, the number of pixels of the first subset and/or second subset is taken into account depending on their position on the surface of the weld seam.

Advantageously, a weld symmetry of the weld seam can be determined based on the number and position of the pixels of the first subset and/or second subset. A weld symmetry means a symmetry of the weld seam, in particular the weld bead, with respect to one or more imaginary lines of symmetry through the weld seam, in particular the weld bead. An asymmetrical weld bead shape can be detected due to a high uneven distribution of pixels of the first subset or the second subset on each side of the symmetry line. Excessive asymmetry indicates poor welding quality.

It can be provided that the weld seam is re-welded depending on the number and position of the pixels of the first subset and/or the second subset. For example, if an asymmetrical weld bead produced as a result of uneven energy input during welding is detected, targeted re-welding can be carried out to produce a symmetrical weld bead. Depending on the number and position of pixels in the first subset or the second subset, the geometry of the weld bead can be recognized so that this geometry can be used for re-welding in order to enable subsequent creation of the desired spherical shape of the weld bead. If, on the other hand, the number of pixels of the first subset or the second subset in the entire edge region of the weld bead is too high, a weld bead that is too flat can then be detected, so that in this case re-welding can be carried out in the entire edge region in order to rework the spherical shape of the weld bead and improve the welding quality. The edge region of the weld bead can be understood as the surface of the end faces of the conductor elements welded to one another, minus the previously mentioned, in particular cut-out, central region. This method enables not only quality control but also simple, fast, and precise post-processing of the component to avoid rejects.

Here a weld power for the re-welding can be selected depending on the number and/or position of the pixels of the first subset and/or of the second subset. This makes it possible to control not only the location but also the intensity of the energy input of the laser beam during re-welding, thus enabling the precise creation of a quality-optimized weld seam.

It is also advantageous if a welding quality of a weld seam and a welding of a different weld seam on the same component, in particular a stator, having a plurality of conductor elements are evaluated simultaneously. Parallel welding and evaluation enables further time savings in the production of the component. Alternatively, it is possible to alternate evaluation and welding.

The object mentioned at the outset is also achieved by a device for evaluating a welding quality of a weld seam between end portions of at least two elongated conductor elements which are welded to one another by irradiation of their end faces. The device comprises: an image capturing means with a beam path. The image capturing means is designed to carry out step (a) of the method according to the invention.

Furthermore, the device has at least one data processing system which is set up to carry out steps (b) and (c) of the method according to the invention.

The device comprises an illumination device which is configured to illuminate the end faces of the conductor elements from a direction along the beam path of the image capturing means.

The device further comprises a laser beam source with a laser beam path for carrying out the welding process for connecting the conductor elements on their end face. In particular, the beam path of the image capturing means and the beam path of the laser beam are coupled into one another, in particular by means of a beam splitter. The beam paths are therefore the same. The image capturing means thus enables an evaluation from the same "angle of view" from which the laser also does its processing.

When carrying out the method, the image is therefore preferably captured along the beam path of the laser that was used for the welding process. The illumination of the weld seam preferably takes place parallel to or along this beam path.

The device according to the invention here has the same advantages as have been explained in detail with reference to the method according to the invention. In addition, features described herein that have been explained with respect to the method can equally be applied to the device. In particular, the device can be configured to carry out the method described herein.

The invention is described in more detail below with reference to the figures, the same or functionally equivalent elements being provided only once with reference signs if necessary.

Figure 1:
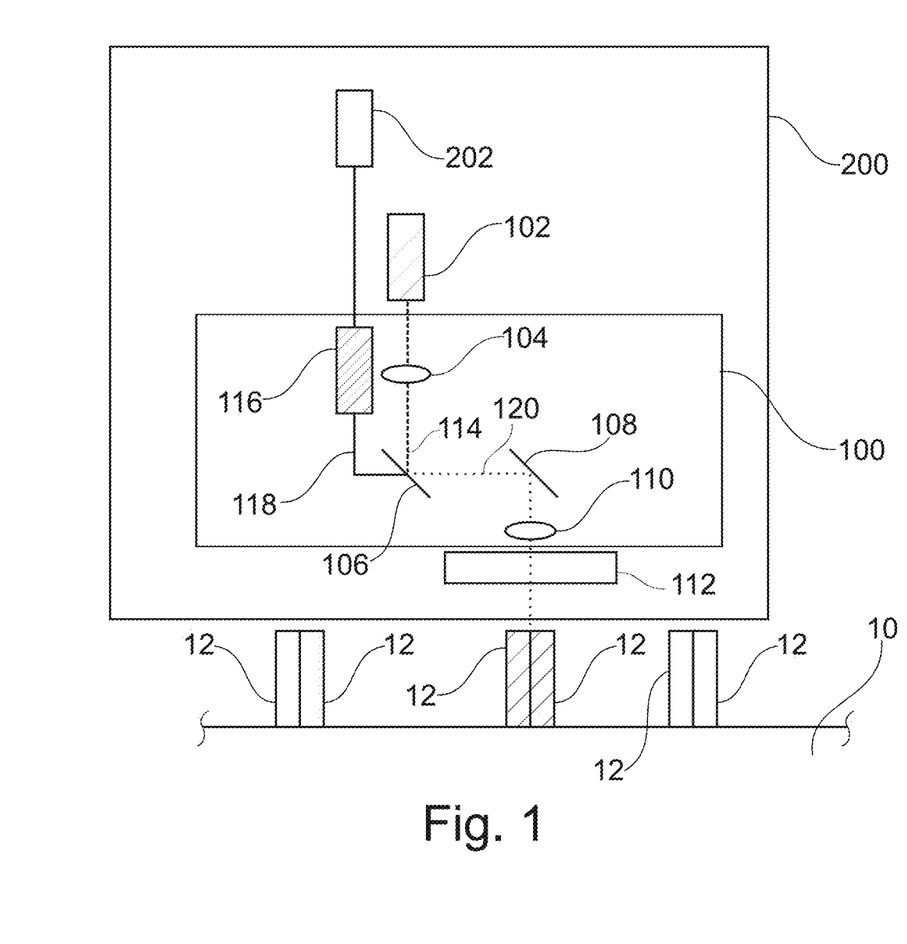
FIG. 1 shows a schematic view of an exemplary embodiment of a device according to the invention.
Figure 2A:
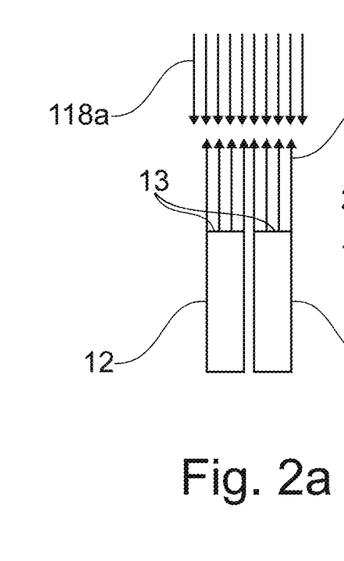
FIGS. 2a, 2b show a schematic side view and a plan view of two conductor elements of a stator from FIG. 1 before welding.
Figures 2B, 3A:
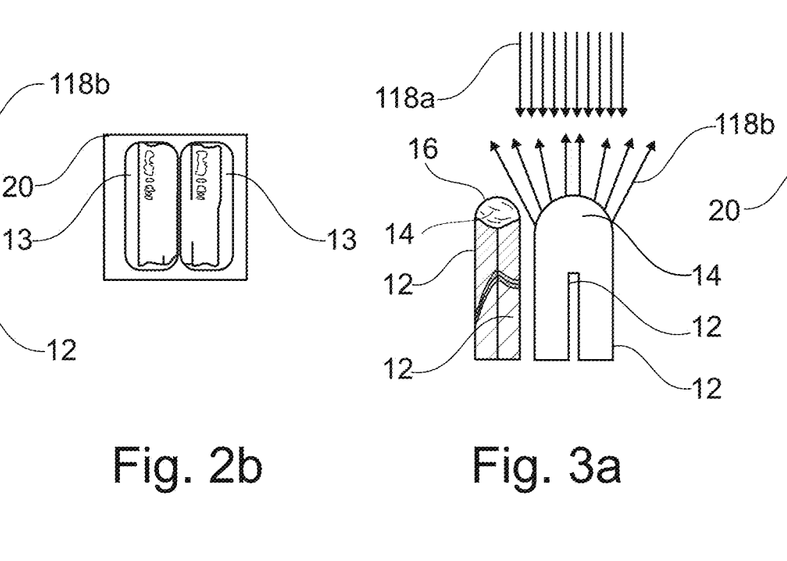
FIGS. 3a, 3b show a schematic side view and a plan view of two conductor elements from FIGS. 2a, 2b after welding.

FIG. 1 shows an exemplary embodiment of a device 200 for evaluating the welding quality of a weld seam 14 (see FIG. 3a). In the present case, the device 200 is also designed to produce the weld seam 14 by laser beam welding by means of a laser beam source 102 and a scanner optics 100.

In addition to a beam guide of the laser beam source 102 (beam path 114), the scanner optics 100 comprises an image capturing means 116, which is also referred to below as camera 116. The beam path 118 of the camera 116 is used to detect the position of, in the present case, two (alternatively more) conductor elements 12 of a component 10 that are to be welded before the actual laser beam welding and thus before the precise laser beam welding of free end sections of the (in each case) two conductor elements 12 of the component 10 with the beam path 114 of the laser beam source 102.

The component 10 in the present case is a stator 10 with hairpins (I-pins or other plug-in coils are also preferred conductor elements within the scope of the invention) as conductor elements 12 of an electric motor. The conductor elements 12 can, for example, be made of copper or at least contain copper for high electrical conductivity.

The beam paths 114, 118 are superimposed or guided coaxially with one another in a common beam path 120 at a beam splitter 106. Here the beam path 114 of the laser 102 is collimated by a collimation lens 104 in front of the beam splitter 106. One or more movable deflecting mirrors 108 of the scanner optics 100 enable a displacement of the coaxially combined beam path 120 in a plane on the surface of the end sections of the conductor elements 12. In the beam direction behind the deflecting mirror 108, there are also arranged a focusing lens 110, which can also be designed as a lens package, for focusing the beam path 120 onto the two end sections of the conductor elements 12, and an additional lighting unit 112 of the device 200, for illuminating the end sections of the conductor elements 12 for the camera 116.

The camera 116 of the scanner optics 100 is used not only for process control of the laser beam welding; rather, according to the method 40 described below (see FIG. 4) it is also used for image recording in the context of evaluating the welding quality of the weld seam 14. Alternatively, an additional camera (not shown) can also be used. In addition to the resulting advantages with regard to the method 40, which are described in more detail below, this also has the advantage that no additional and costly equipment is required to enable checking of the welding quality; rather, the means already provided for welding can be used. One or more data processing systems 202, also referred to as computers 202, of the device 200, the function of which will be explained in more detail later, may already be present or may be added.

FIG. 2a shows, using a still unwelded pair of elongated conductor elements 12 or hairpins, how light 118a of the beam path 118 of the camera 116 or of the lighting unit 112 is incident on the surface of end faces 13 of unwelded end sections of the conductor elements 12. This light 118a is reflected back vertically at the end faces 13 on the unwelded end sections as light 118b, because the end faces 13 of the end sections of the conductor elements 12 are perpendicular to the direction of the light 118a. FIG. 2b shows a schematic image 20 that was taken by the camera 116, and shows the illuminated end faces 13 of the end sections of the conductor elements 12.

FIG. 3a, on the other hand, uses a welded pair of end sections of elongated conductor elements 12 or hairpins to show how light 118a of the beam path 118 of the camera 116 is incident on the end faces 13 of welded end sections of the conductor elements 12. In contrast to FIGS. 2a and 2b, the end faces 13 can no longer be seen separately here or have been connected to one another by welding (however, reference is still made herein to the end faces 13). The light 118a here strikes a weld bead 16, produced by laser beam welding using the laser beam source 102, of the weld seam 14, which connects the two end sections of the conductor elements 12 to one another at the end faces 13. The weld bead 16 is spherical in shape. In this case, a high welding quality can be assumed because the spherical shape of the weld bead 16 is uniform, and therefore a large connection cross-section between the conductor elements 12, or their ends, can be assumed. Unlike in FIG. 2a, here the light 118a is not reflected centrally. Instead, reflected light 118b is predominantly reflected back to the camera 116 in a middle or central region of the weld bead 16, and is otherwise predominantly scattered outwards. The more spherical the shape of the weld bead 16 is, the more of the surface of the weld bead 16 is oblique to the direction of incidence of the light 118a, so that less light 118b is reflected back to the camera 116 and is captured by it when taking an image 20. However, the flatter the weld bead 16 is, the weaker and therefore more unstable it is. In the case of a flat weld bead 16, which indicates poor welding quality due to a small connection cross-section of the weld seam 14, more light 118b is reflected onto the camera 116 and captured when the image 20 is taken.

Figure 3B:
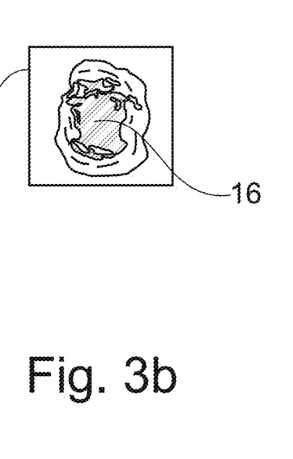

By means of different proportions or amounts of light reflection, conclusions can be drawn about the shape of the weld bead 16, and thus about the connection cross-section and thus the welding quality, which is determined by the connection cross-section, of the weld seam 14 produced. The method 40 described below makes use of this correlation between the shape of the weld bead 16 and the associated welding quality of the weld seam 14 with the light in the image 20 recorded by the camera 116. FIG. 3b shows an image 20 of the end faces 13 of the welded end sections of the conductor elements 12 taken by the camera 116, wherein the weld bead 16 is clearly visible here and the pixel density of the image 20 decreases towards the outside or towards an edge region of the weld bead 16.

Figure 4:
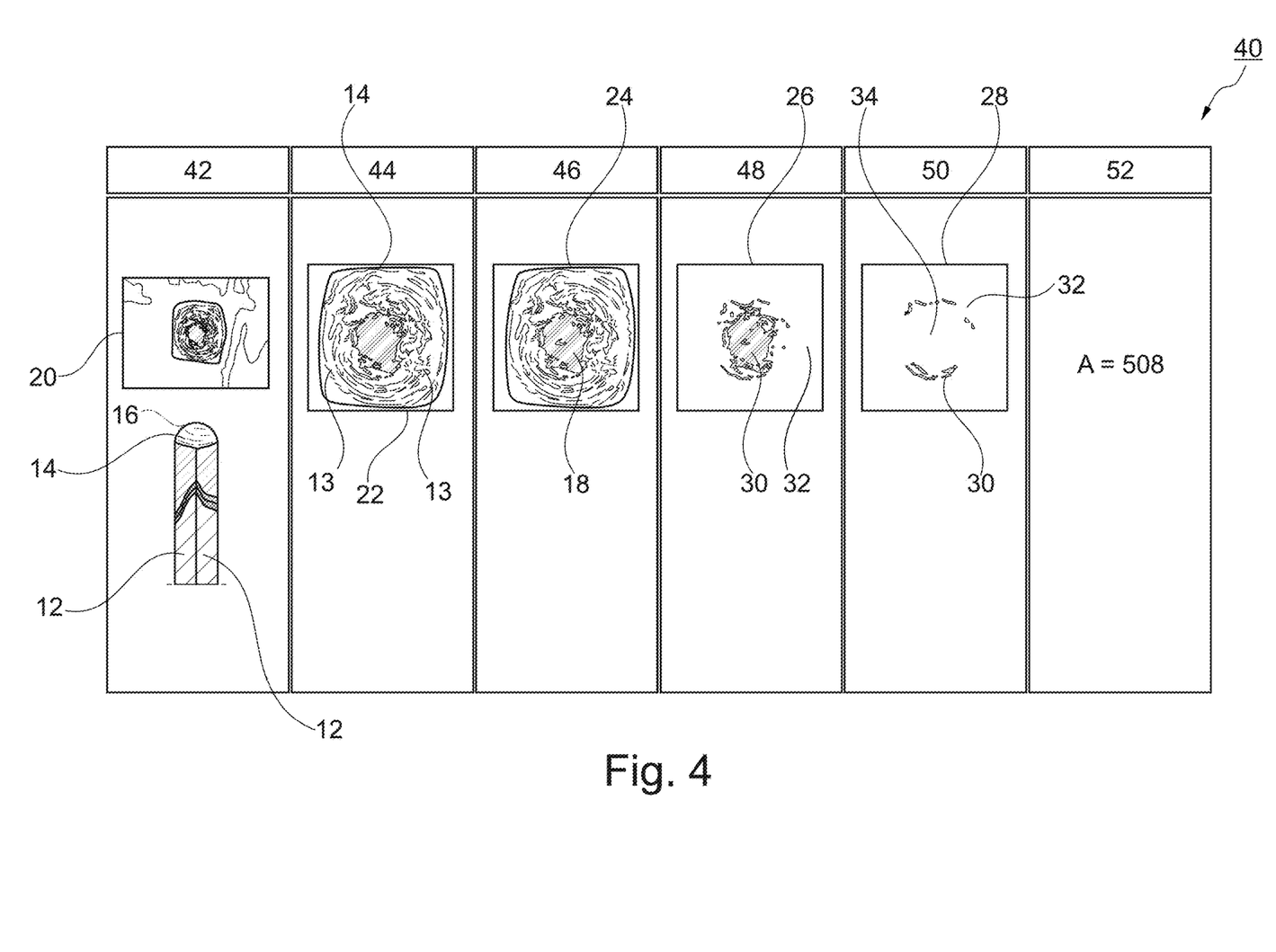
FIG. 4 shows a schematic representation of steps of an exemplary embodiment of a method according to the invention for evaluating the welding quality of a weld seam on two conductor elements of the stator from FIG. 1.

FIG. 4 now shows a sequence of an exemplary method 40 according to the invention for evaluating the welding quality of a pair of conductor elements 12 welded at their end sections. The method 40 described here by way of example comprises the method steps 42, 44, 46, 48, 50, 52, and 54 (see FIG. 7), wherein some of the listed method steps, as previously described herein, are merely advantageous but not absolutely necessary.

In a first method step 42, an image 20 of the weld seam 14 is taken by means of the camera 116 positioned with its beam path 118 above the weld bead 16 of the weld seam 14 or its weld bead 16. Although at this point and in the following only one weld bead 16 or one weld seam 14 is mentioned, it is also possible to take an image 20 with a larger region of the component 10, which includes a plurality of weld beads 16 or weld seams 14, so that a plurality of weld beads 16 can be evaluated at least temporarily simultaneously with regard to their welding quality and the method 40 can be carried out particularly quickly.

The recorded image 20 comprises a region that is larger than the weld seam 14, so that the image 20 is cropped in a second method step 44 to obtain an image 22 cropped to a region of the weld seam 14. From above (i.e. from the viewing direction of the camera 116 when looking perpendicularly at the end faces 13), the individual conductor elements 12 and their end faces 13, which are only indicated here, can no longer be seen; instead, the weld bead 16 can be seen from above.

In a third method step 46, an intensity level threshold value is determined in the form of a gray level value (in the case of a color image, a color value is also possible) for the cropped image 22; the image 20 was recorded as a gray level image in method step 40. In the present example, this intensity level threshold value determination is used for the subsequent binarization according to a threshold value method in the fourth method step 48.

Using the determined threshold value, the pixels of the cropped image 22 are divided into two subsets. Pixels of the first subset 30 are pixels whose intensity levels are greater than the determined intensity level threshold value. In a gray level image, these pixels are bright pixels, or pixels in places where a lot of light was reflected back towards the camera. Pixels of the second subset 32 are pixels whose intensity level is less than or equal to the intensity level threshold value.

In a threshold value image 24, for this purpose only the pixels or regions 18 of the cropped image 22 are marked that lie above the determined intensity level threshold value (pixels of the first subset 30). The remaining pixels in the threshold value image 24 are below or at the threshold value and belong to its second subset 32.

In the fourth method step 48, a binary image is generated 26 with white pixels of the first subset 30 and black pixels of the second subset 32. The intensity level threshold value, which in this case is a gray level threshold value, can be individually adjusted for different lighting units 112.

All pixels above the threshold value are grouped as white pixels, while all pixels at or below the threshold value are grouped as black pixels. The "color depth" is therefore reduced. In addition, the colors can be inverted to improve visual recognition for a user monitoring the recognition process.

The images can also be evaluated without binarization and directly after the threshold value analysis.

In a fifth method step 50, a central region 34 is cut out of the binary image 26 thus obtained, so that a binary image 28 is obtained that is again cropped. The central region 34 can also simply be left out of the subsequent evaluation and does not actually have to be cut out. This is because the central region 34 appears bright due to the reflection and contains predominantly white pixels of the first subset 30 anyway, so that it typically does not provide any information about the welding quality of the weld seam 14. The cutout of the central region 34 can be round here, following the spherical shape of the weld bead 16. The radius of the round cutout depends on the dimensions of the conductor elements 12 or their end sections and the welding strategy. When connecting more than 2 conductor elements, an elliptical central region 34 is typically masked out instead of a circular region. The radius (for a circular central region 34) can be defined in different ways. An example is that images 20 of weld seams 14 with sufficient welding quality are used and consideration is given to how large the radius must be so that a certain amount, for example 90%, of all white pixels of the first subset 30 lie in the round cutout. From this, an average value can be formed, which can then be defined as the radius of the round, central region 34. Advantageously, the amount of data to be processed for the method 40 can be reduced in this way.

Then, in a sixth method step 52, the number A of white pixels, or pixels of the first subset 30, in the cropped binary image 28 can be counted. In this example of the weld seam 14 in the cropped binary image 28 of FIG. 4, the number A=508 white pixels of the first subset 30.

Figure 7:
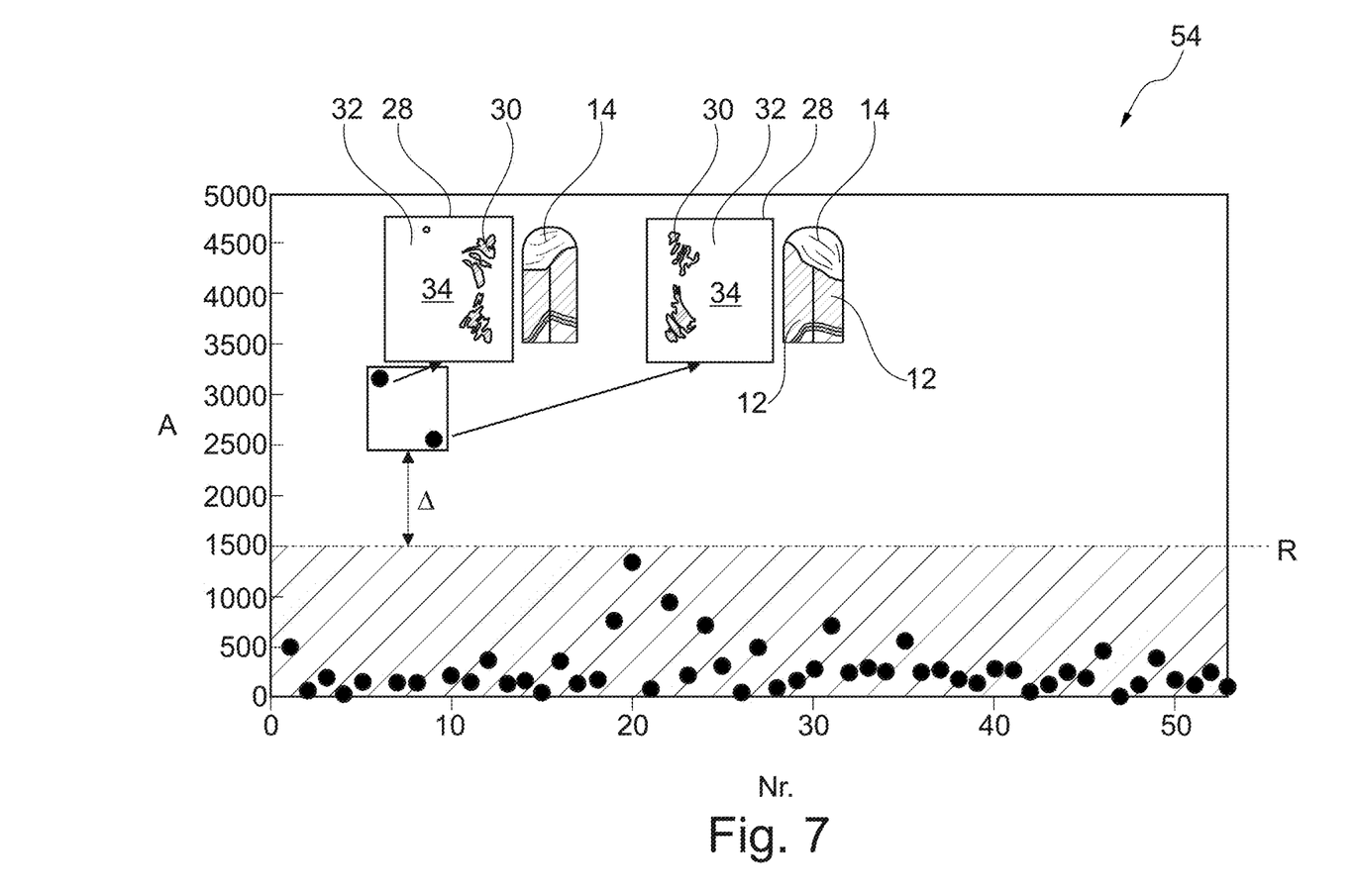
FIG. 7 shows a schematic representation of the number of white pixels per weld bead for a plurality of weld beads of pairs of conductor elements of the stator of FIG. 1.

Finally, in a seventh method step 54, as shown in FIG. 7, the welding quality of the weld seam 14 is determined based on a comparison with a pixel target value or pixel target range. For example, the pixel target value in FIG. 7 is given particularly simply by a reference value R in the form of a number of white pixels of the first subset 30, which here is R=1,500 white pixels, i.e. pixels of the first subset 30. Thus, with a number A=508 white pixels of the first subset 30, it can be concluded that the weld bead 16 is sufficiently spherical to ensure a sufficiently high welding quality, because in the edge region of the weld bead 16 fewer than 1,500 white pixels of the first subset 30 appear, i.e. are reflected back to the camera 116 in the form of light.

A number of more than 1,500 white pixels in the first subset 30, on the other hand, would indicate that the weld bead 16 is flat rather than spherical, because too much light is reflected back to the camera 116 in the edge region of the weld seam 14, which is captured by the binarization as white pixels of the first subset 30. Possible causes for this can be, for example, incorrect positioning of the beam path 114 of the laser beam source 102, too low a power of the laser beam source 102, too short a welding time and too large a gap between the end sections of the conductor elements 12. Consequently, a poor welding quality can be determined.

Figure 5:
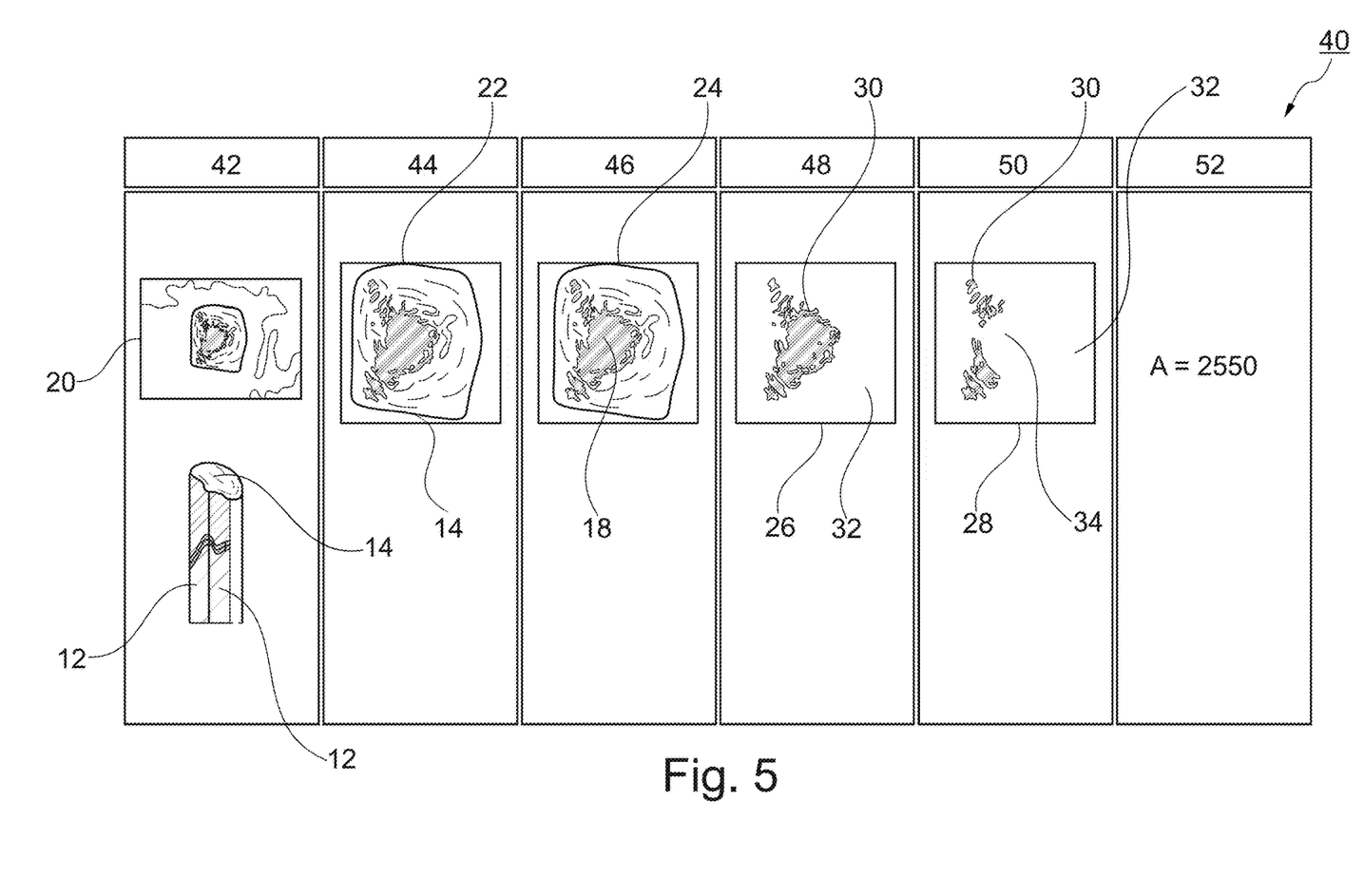
FIG. 5 shows a schematic representation of steps of an exemplary embodiment of a method according to the invention for evaluating the welding quality of another weld seam of two conductor elements of the stator from FIG. 1.

In addition to this determination, based on a quantitative determination of white pixels of the first subset 30, of a high-quality or properly made weld seam 14 and an improperly made or poor-quality weld seam 14, in the determination of the welding quality further qualitative, in particular location-dependent, determinations are also possible, as is shown for example by the embodiment of the method 40 in FIG. 5.

In FIG. 5 it can be seen that the weld bead 16 is formed asymmetrically, so that it is inclined towards one of the two conductor elements 12. In addition to the very high number of A=2,550 white pixels of the first subset 30 in the cropped binary image 28, this can be seen in that the white pixels of the first subset 30 are only visible, or are very predominantly visible, on one side of the edge region of the weld bead 16 in the cropped binary image 28. From this it can be concluded that there is an asymmetrical weld bead 16 here, as also shown in FIG. 5. For example, this could be detected by a target range test. For example, it can be checked whether a certain number of pixels of the first subset are present in each of the individual quadrants of the binary image 28. It is also possible to check for a certain form of distribution of the pixels of the first subset.

The evaluation method 40 can be controlled by at least one computer 202, which is part of the device 200 and, as shown, can be connected to the camera 116 in order to carry out the recording in each case of the image 20 and the further method steps of the method 40.

The at least one computer 202 can also be connected to a control device (not shown) of the laser beam source 102 in order to transmit to it the information about the weld bead 16 obtained from the method 40 and/or to control the laser beam source 102. As a result, the laser beam source 102 can be given, for example, the information of the asymmetrical weld bead 16, so that the device 200 can then carry out re-welding in the region of insufficient welding, identified on the basis of the missing white pixels of the first subset 30, in such a way that the weld bead 16 becomes symmetrical and spherical as a result of the re-welding. In other words, the number A and the position of the white pixels of the first subset 30 determine the location and preferably also the level of energy input during re-welding by means of the laser beam source 102.

Figure 6:
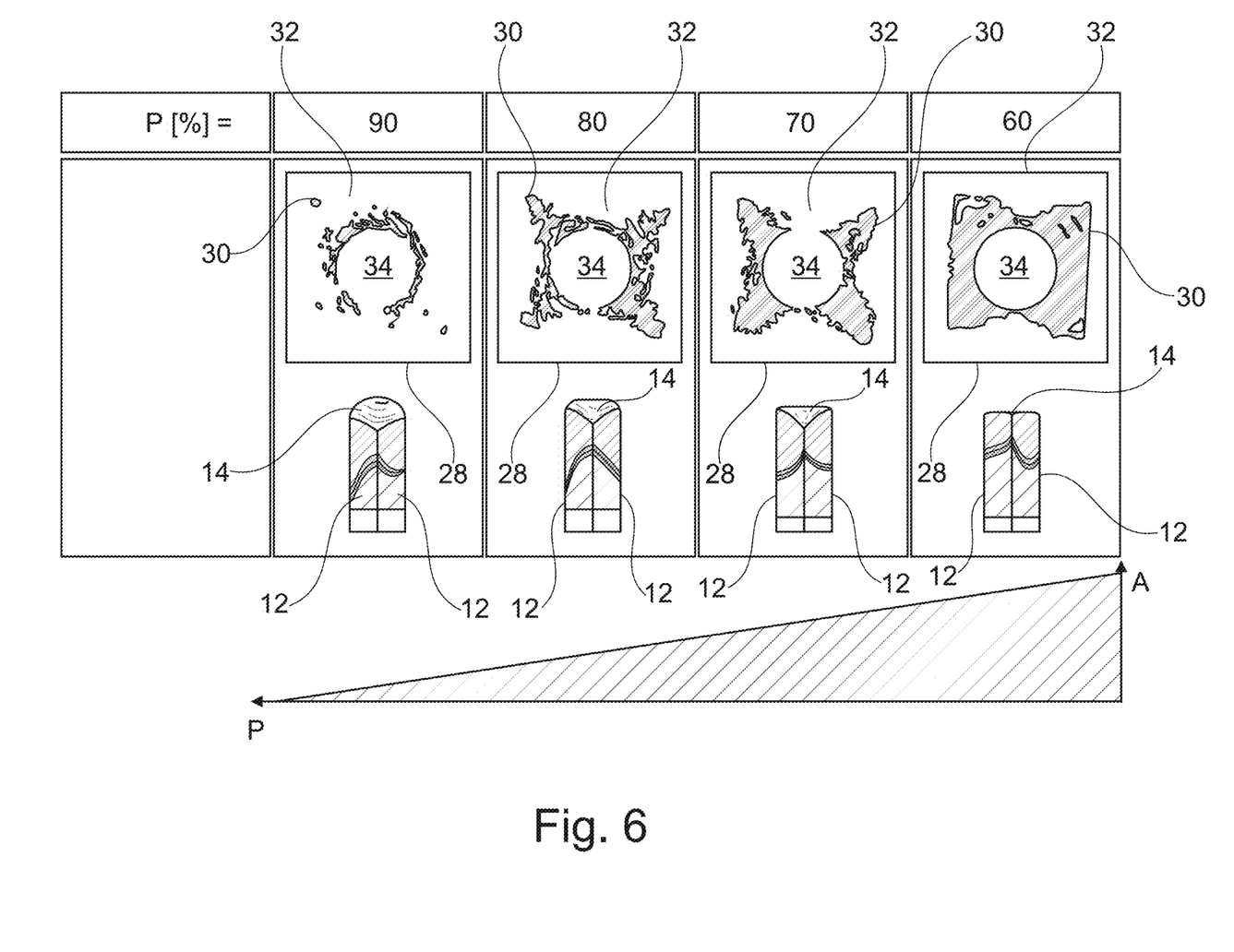
FIG. 6 shows a schematic representation of binary images of weld seams welded with different laser power and the weld beads of the weld seams of two conductor elements of the stator from FIG. 1.

FIG. 6 shows cropped binary images 28 and associated weld beads 16 at exemplary, different laser powers P (indicated in % of the maximum power) of the laser beam source 102 with the same welding time. It can be seen that the selected laser power P, and also the duration, has a considerable influence on the formation of the weld bead 16 and thus on the welding quality of the weld seam 14 during laser beam welding. As the laser power P decreases, the weld bead 16 becomes increasingly flatter and the number A of white pixels of the first subset 30 in the edge region of the weld seam 14 increases. The connection cross-section of the weld seam 14 decreases accordingly and the weld seam 14 becomes unstable and may not be able to withstand the load during operation of the stator 10 in the electric motor.

If a number of white pixels of the first subset 30 that is above the reference value R or target value is distributed rather uniformly around the central region 34, e.g. due to too low laser power or too short a welding time, as can be seen in FIG. 6, this can not only be detected by means of the method 40, but also the entire pair of conductor elements 12 can be welded again. This can be done, for example, via a pixel target region analysis or a separate analysis step to determine any necessary post-processing of the weld seam. Here, the local distribution of the individual pixels of the individual subsets can be analyzed in detail in order to draw more detailed conclusions about the shape and position of the existing weld seam and to further determine the optimal location and optimal level of an additional energy input. The number of remaining white pixels of the first subset 30 can determine the energy input during re-welding.

FIG. 7, already partially explained, shows a plurality of numbers (no.) of pairs of conductor elements 12 on the stator 10 which have been welded. Two outliers of welded conductor elements 12 are shown, which have a significant difference A in the number A of white pixels of the first subset 30 compared to the reference value R. The associated weld beads 16 are also formed asymmetrically.

The invention claimed is:

1. Method (40) for evaluating a welding quality of a weld seam (14) with which the end sections of at least two elongated conductor elements (12) are welded to one another by irradiating their end faces (13), wherein the method (40) comprises the following steps:
   (a) capturing an image (20) of the end faces (13) of the conductor elements (12) welded to one another by means of the weld seam (14), wherein the image (20) is recorded from the end faces (13) of the conductor elements (12) and the environment recorded by the image (20) comprises at least an entire surface of the weld seam (14), and wherein the image (20) is recorded with different intensity levels in pixels of the image (20), wherein the intensity levels are an indicator of the amount of light that was locally reflected from the recorded position when the image (20) was recorded, and the indicator is thus a measure of a local orientation of the surface of the weld seam (14), in particular wherein the weld seam is illuminated with light parallel to the direction in which the image was recorded,
   (b) dividing the image (20) into at least one first subset (30) of pixels whose intensity levels are greater than a specified intensity level threshold value and into at least one second subset (32) of pixels whose intensity levels are less than or equal to the intensity level threshold value, and
   (c) assessing the welding quality of the weld seam (14) based on a comparison of a number and/or position of the pixels of the first subset (30) and/or of the second subset (32) with at least one pixel target value of a number and/or a pixel target range of a position of pixels of the first subset (30) and/or of the second subset (32) that correspond to a weld seam of desired quality.

2. Method (40) according to claim 1, wherein the intensity levels are gray levels and the intensity level threshold value is a gray level threshold value.

3. Method (40) according to claim 1, wherein the conductor elements (12) are plug-in coils, in particular hairpins and/or I-pins, of a stator (10) of an electrodynamic machine.

4. Method (40) according to claim 1, wherein a higher-level image (20) is captured which comprises a plurality of weld seams (14) of at least two end sections of conductor elements (12) in each case, and assessing the welding quality is carried out for each of the weld seams (14).

5. Method (40) according to claim 1, wherein the welding quality of a weld seam (14) is evaluated, by which the end sections of at least three conductor elements (12) are welded to one another at their end faces.

6. Method (40) according to claim 1, wherein a central region (34) of the image (20), which corresponds to the center of the intended position of the weld seam, in particular weld bead, is not taken into account in the assessment according to step (c).

7. Method (40) according to claim 6, wherein the central region (34) is a round or elliptical region having a predetermined size, into which a predetermined minimum number of pixels of the first subset (30) or the second subset (32) fall when the weld seam (14) is properly made.

8. Method (40) according to claim 1, wherein the pixel target value of the number and/or the pixel target range of the position is determined by a selection of a minimum connection cross-section as a quality feature of the welding quality.

9. Method (40) according to claim 8, wherein data relating to a plurality of weld seams deemed to be good are used for determining the pixel target value of the number and/or the pixel target range of the position, in order to ascertain the pixel target value or the pixel target range by correlating the position and/or the number of individual intensity levels of pixels with connection cross-sections of weld seams (14).

10. Method (40) according to claim 1, wherein assessing the welding quality of the weld seam (14) comprises assessing a symmetry of the weld seam (14) based on the number and position of the pixels of the first subset (30) and/or the second subset (32).

11. Method (40) according to claim 1, wherein the weld seam (14) is rewelded depending on the number and position of the pixels of the first subset (30) and/or the second subset (32).

12. Method (40) according to claim 11, wherein a weld power for the rewelding is selected depending on the number and/or position of the pixels of the first subset (30) and/or the second subset (32).

13. Method (40) according to claim 1, wherein a welding quality of a weld seam (14) and welding of a different weld seam (14) on the same component (10) having a plurality of conductor elements (12) are evaluated simultaneously.

14. Device (200) for evaluating a welding quality of a weld seam (14) between end sections of at least two elongated conductor elements (12) which are welded to one another by irradiating their end faces (13), the device (200) comprising:

an image capturing device (116) having a beam path (118), which is designed to carry out step (a) of the method according to claim 1; and at least one data processing system (202) which is configured to carry out steps (b) and (c) of the method according to claim 1.

15. Device according to claim 14, wherein the device comprises an illumination source (112) configured to illuminate the end faces (13) of the conductor elements (12) from a direction along the beam path (118) of the image capturing means (116).

16. Device according to claim 14, wherein the device further comprises a laser beam source (102) with a beam path (114) of the laser beam for carrying out the welding process for connecting the conductor elements (12) at their end face (13), in particular wherein the beam path (118) of the image capturing means (116) and the beam path (114) of the laser beam are coupled into one another, in particular by means of a beam splitter (106).

* * * * *